United States Patent [19]

Ehn, Jr. et al.

[11] Patent Number: 4,924,663
[45] Date of Patent: May 15, 1990

[54] MOWER-MOUNTED GRASS CATCHER AND REEL LAWN MOWER ASSEMBLY AND METHOD OF MAKING SAME

[75] Inventors: Byron N. Ehn, Jr., Menomonee Falls; James W. Mast, Racine, both of Wis.

[73] Assignee: Textron, Inc., Providence, R.I.

[21] Appl. No.: 348,967

[22] Filed: May 8, 1989

[51] Int. Cl.⁵ .............................................. A01D 34/70
[52] U.S. Cl. .................... 56/202; 56/DIG. 9
[58] Field of Search .................... 56/5, 194, 199, 202, 56/DIG. 8, DIG. 9

[56] References Cited

U.S. PATENT DOCUMENTS

| | | |
|---|---|---|
| 426,984 | 4/1890 | Coldwell. |
| 939,068 | 11/1909 | McGrath ............................... 56/199 |
| 1,798,021 | 3/1931 | Jerram. |
| 2,015,740 | 10/1935 | Worthington .......................... 56/7 |
| 3,110,147 | 11/1963 | Barth ..................................... 56/199 |
| 3,517,493 | 6/1970 | Kiteley .................................. 56/194 |
| 3,757,503 | 9/1973 | Soldavini ............................... 56/202 |
| 3,805,499 | 4/1974 | Woelffer et al. ....................... 56/202 |
| 4,648,238 | 3/1987 | Greider et al. ........................ 56/202 |

FOREIGN PATENT DOCUMENTS 3532700  3/1987  Fed. Rep. of Germany ........ 56/194

Primary Examiner—Jerome W. Massie, IV
Assistant Examiner—Terry Lee Melius
Attorney, Agent, or Firm—Arthur J. Hansmann

[57] ABSTRACT

A mower-mounted grass catcher and reel lawn mower assembly and method of making same. The catcher has two spaced-apart bores which receive two pins on the mower for mounting the catcher in a cantilever manner and on the mower. The bores are strengthened and are located in the opposite sides of the catcher which also has two handles for maneuvering the catcher. The upper panel and the lower panel of the catcher, adjacent the opening for the clippings, are reinforced with ribbing. The catcher is molded for extra-strength in the area defining the bores.

19 Claims, 3 Drawing Sheets

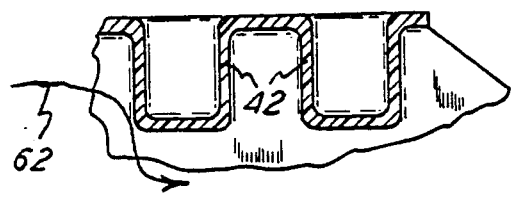
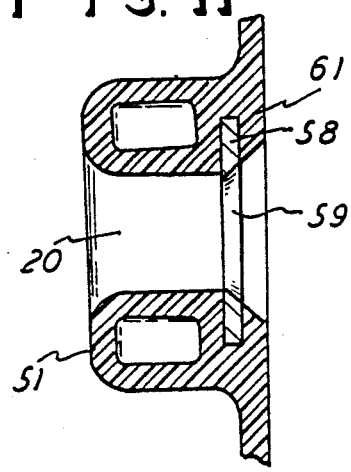
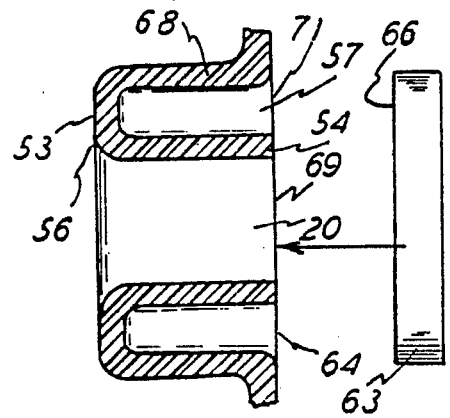
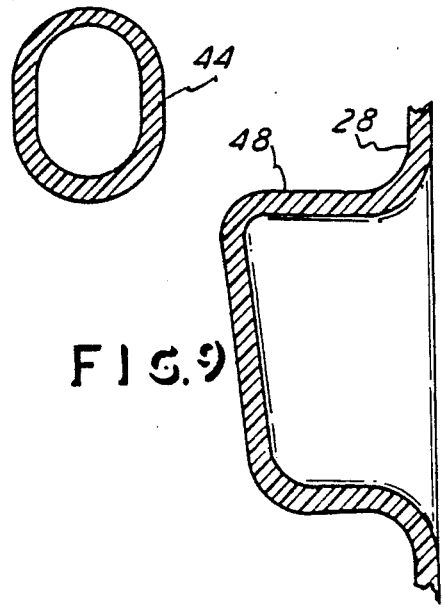
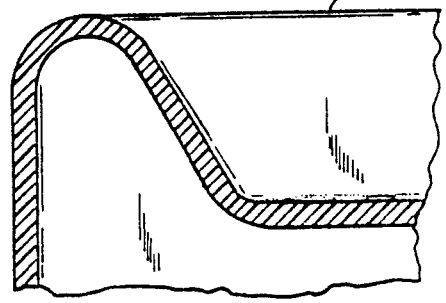

MOWER-MOUNTED GRASS CATCHER AND REEL LAWN MOWER ASSEMBLY AND METHOD OF MAKING SAME

This invention relates to a mower-mounted grass catcher and reel lawn mower assembly, and, more particularly it relates to a plastic catcher which is removably mounted on the frame of a reel-type lawn mower which throws the grass clippings directly into the mower-mounted catcher.

BACKGROUND OF THE INVENTION

Catchers which are removably mounted either forwardly or rearwardly of a reel-type lawn mower are already well known in the art. These catchers are of rigid body construction, usually of either metal or plastic material. Current day catchers are most commonly made of plastic material and are arranged with mounting means for attaching and removing the catcher on the reel mower. Examples of such prior art of forwardly mounted catchers are found in U.S. Pat. Nos. 426,984 and 1,798,021 and 2,015,740.

The present invention differs from the aforesaid prior art in that it provides for an assembly of a mower-mounted catcher and reel-type lawn mower wherein the catcher can be cantilever mounted on the mower and be removed therefrom by horizontal motion, rather than requiring complete lifting of the catcher from the mower. That is, in the present invention, the catcher can be removed from the mower by sliding it horizontally on mounting pins on the mower, and thereby the catcher can be removed from confined spaces where in present-day tractor and like type mowing machines the catcher is disposed within confined spaces underneath the tractor or the like. Likewise, the catcher can be readily and easily and accurately remounted on the mower by sliding it horizontally in the confined space. Therefore, the present invention is particularly adaptable to a gang type of lawn mower where a tractor is employed for the support and mobility of a plurality of assembled mower and catcher combinations.

With regard to the aforesaid prior art, the present invention has further advantages such as the feasibility of making the catcher of a plastic material and having reinforcement for strength adjacent the clipping entry opening and also having arrangements for air flow into and out of the catcher and having side handles for maneuvering the catcher. Still further, the plastic molded catcher is of a reinforced and/or sturdy construction in the locations where the catcher mounts onto the mower, such as through horizontally disposed pins which slide into reinforced sleeves or bores in the catcher. Accordingly, the molded plastic catcher is of a configuration which is strong and resists any distortion in its shape and it therefore retains the clippings while it is still mounted on the mower. The catcher construction is also such that it has excellent durability while being light weight and reasonably inexpensive in its construction.

Apart from the prior art of mower-mounted catchers on reel mowers, there is mower and catcher prior art which utilizes pin or rod mounting of catchers onto mowers and which also utilizes plastic catchers and has reinforcing plates on the catcher and also which has ribbing or the like along the wall of the catcher, for availability to avoid distortion in the wall. Accordingly, U.S. Pat. No. 3,805,499 shows a type of catcher mounting which has hooks for engaging openings in the mower for releasably attaching the catcher to the mower. However, the catcher is not removable in horizontal motion only, and it must be carefully maneuvered for removal and mounting relative to the mower. Also, U.S. Pat. No. 3,110,147 shows a plastic type catcher which has plates on opposite side walls thereof for strengthening of the catcher at the location where the catcher rods or hooks are attached for purposes of extending to the mower to attach therewith. Again, the catcher must be raised for removal, and a complete separate plate is utilized for reinforcing the catcher, contrary to the present invention which is made in a molded plastic with inherent strength or reinforcement.

U.S. Pat. No. 4,648,238 shows a plastic catcher which has a display of ribs along the bottom thereof and which has recessed portions along the top thereof, both available for strengthening of the catcher, but differing from the present invention in that they are not arranged in the manner claimed in this invention and located adjacent the catcher opening for strengthening that location and for actually providing a hand grip or handle feature adjacent the opening.

Finally, the prior art has disclosed catchers with integral handles molded therein, and commonly at the top of the catcher, such as seen in U.S. Pat. Nos. 3,517,493 and 3,757,503. Here again, these disclosures differ from the prior art in that the present invention provides for the handling of the catcher with handles on locations which permit the catcher to be moved horizontally from confined spaces underneath a tractor or like support for the assembled catcher and mower, and the handle arrangement in the present invention also serves as a side-wall reinforcement member for the body of the catcher itself.

BRIEF DESCRIPTION OF THE DRAWINGS

FIGS. 3, 4 and 5 are respectively top, frontal elevation, and side elevation views of the catcher of FIG. 1.

FIGS. 6 through 11 except for FIG. 8, are enlarged sectional views taken on those respective lines shown on FIGS. 3 and 5.

FIG. 8 is a view similar to FIG. 11, but with an inventive portion omitted in FIG. 8.

DETAILED DESCRIPTION OF THE PREFERRED EMBODIMENT

Figure 1:
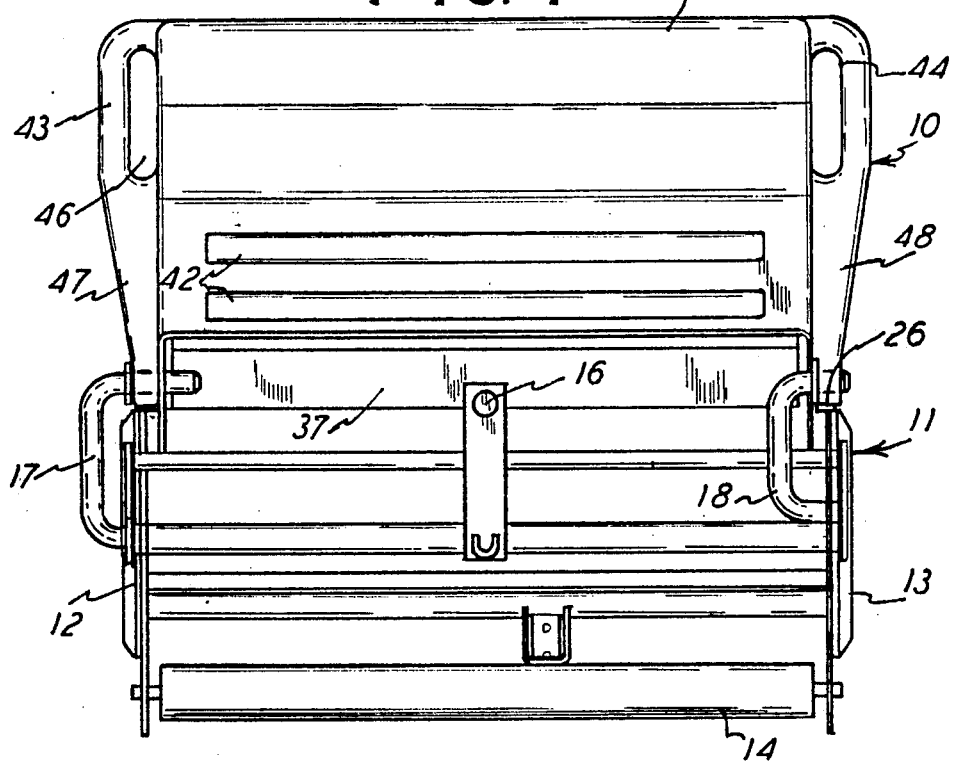
FIG. 1 is a top plan view of an assembled mower and catcher of this invention.

FIG. 1 shows the assembly of the catcher 10 and mower 11 of this invention, and one skilled in the art will readily understand mower 11 is a reel type of mower having frame members 12 and 13 at opposite sides thereof and having a ground-engaging roller 14. Also, the usual tractor attaching post 16 is included in the mower for attachment to a tractor (unshown) or the like, for propelling the assembly forwardly in the mowing operation, and this could be as shown in U.S. Pat. No. 2,015,740, for instance. Thus the mower shown in FIG. 1 has the catcher 10 forwardly mounted, though it will be understood that the catcher could be mounted on a mower and rearwardly thereof for catching the clippings thrown by the rearwardly discharging reel of the mower.

Figure 2:
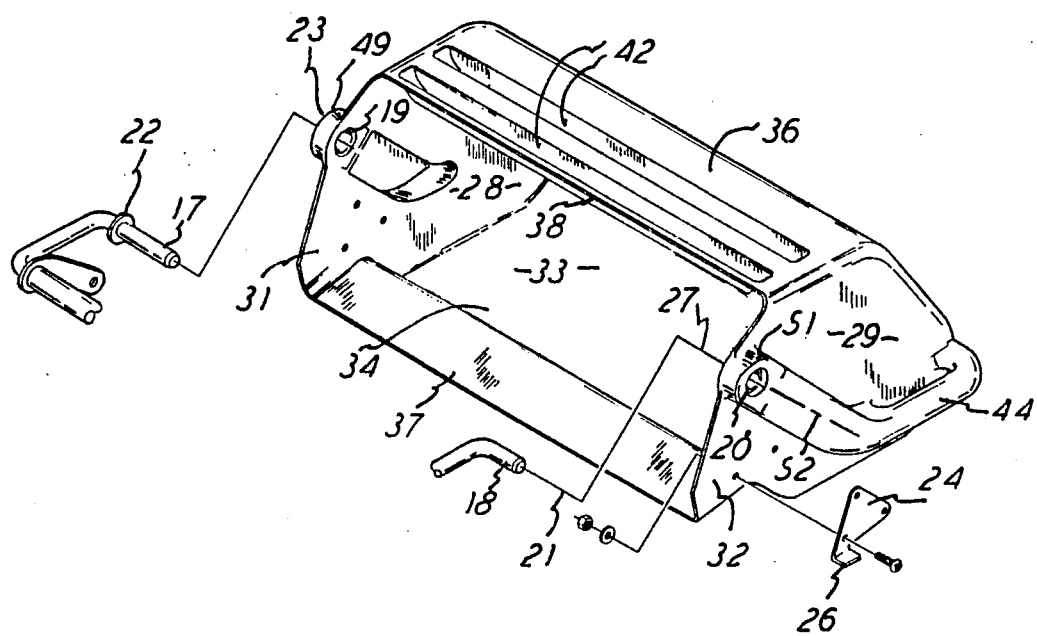
FIG. 2 is a perspective view of the catcher of FIG. 1, and showing part of the mower, in exploded format.
Figure 3:
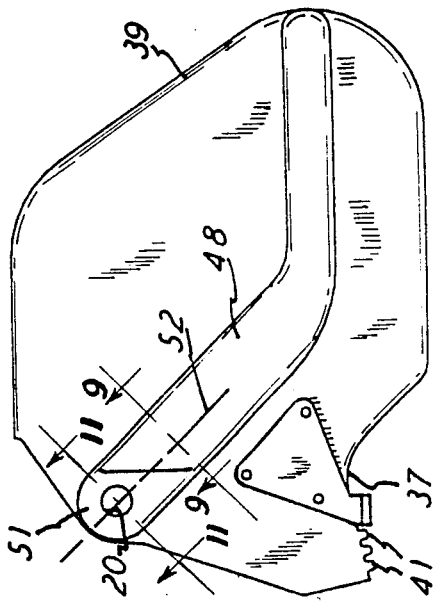
Figure 3:
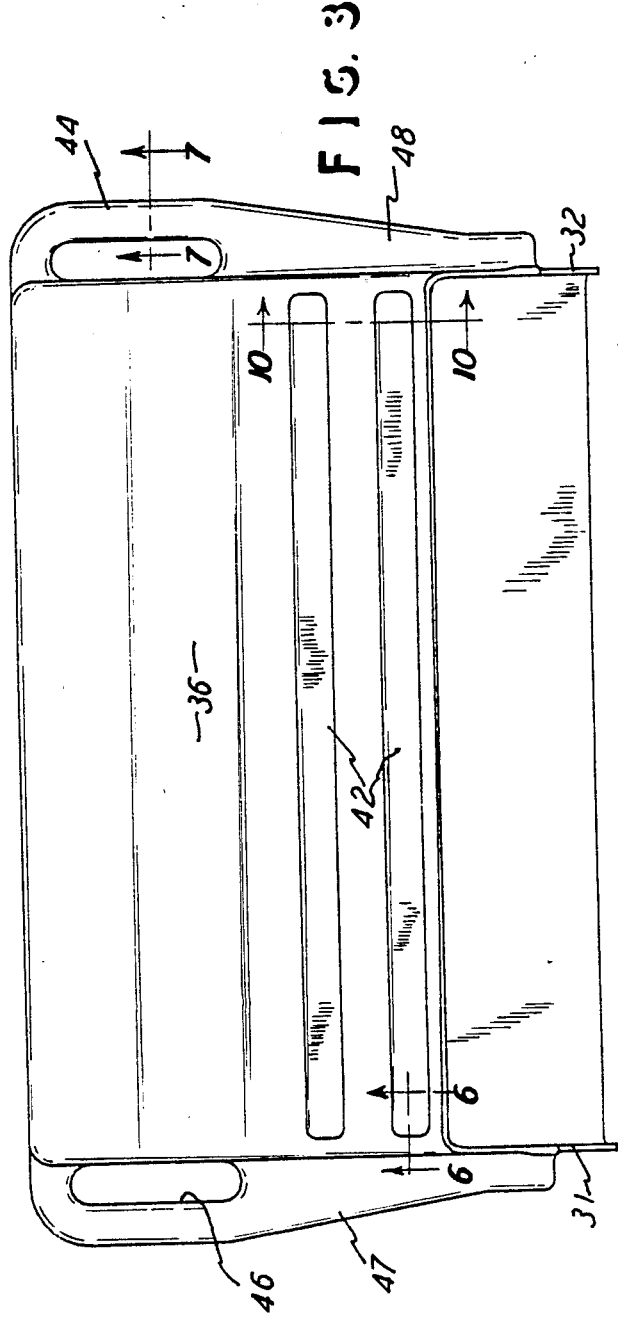

FIGS. 1 and 2 further show that there is a mower lift yoke assembly which includes mounting pins 17 and 18, and the catcher 10 has openings or bores 19 and 20 for respectively receiving the pins 17 and 18 in the cantilever mounting of the catcher 10 on the lift assembly and thus with the mower 11, as shown in FIG. 1.

The pins 17 and 18 suitably extend from the frame, such as the members 12 and 13, of the mower 11, and they extend along the horizontal axis, such as designated 21, and they are both directed to the right, as viewed in FIGS. 1 and 2. Also, it will be noted that the extending pin 17 is longer than the extending pin 18, and thus the catcher 10 can be mounted on the mower by initial engagement of the pin 17 at the catcher bore 19 and then sliding the catcher 10 leftward and directing engagement of the shorter mower pin 18 in the right-hand catcher bore 20. In that manner, the operator can maneuver the catcher 10 through horizontal motion in the mounting and dismounting of the catcher 10 relative to the mower 11. Further, the entire weight of the catcher 10 need not be lifted directly off the mower 11, but the horizontal sliding action can be employed, and thus where the catcher 10 is in a confined space beneath a tractor, then the catcher can be moved horizontally from the confined overhead limitation in the space and then removed from the tractor for emptying the clippings therefrom, and the reverse order can be employed for mounting the catcher 10 on the mower pins 17 and 18.

Figure 4:
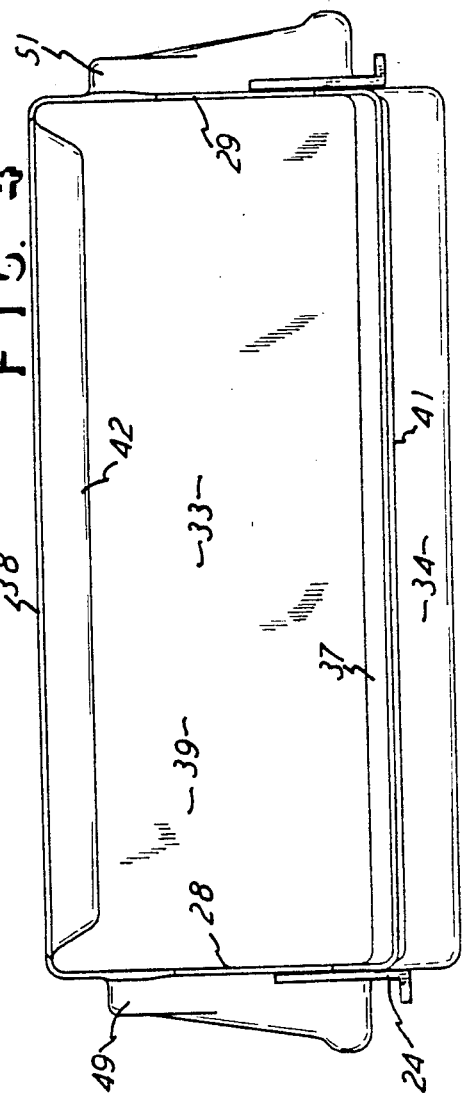

Further, a catcher abutment or stop 22 is affixed to the pin 17 to thereby engage the catcher surface 23 and thus position and likewise limit leftward movement of the catcher 10 relative to the mower 11. Additionally, a plate, such as the plate 24, is on each side of the catcher 10, as shown in FIGS. 2, 4, and 5, and the plates 24 are bolted to the catcher sides and include an abutment tang 26 which is suitably positioned to contact the frame of the mower 11, such as the frame pieces 12 and 13, respectively, for cantilever mounting of the catcher 10 on the mower 11. Thus, the weight of the catcher 10 is pivotal about the mounting axis designated 27 in FIG. 2, and the catcher thus swings about the axis 27 to have the abutment 26 bear against the mower frame. Further, the catcher has oppositely disposed side walls 28 and 29 which include extensions 31 and 32, respectively, and these extensions are disposed spaced inwardly relative to the mower frame side pieces 12 and 13, as shown in FIG. 1. Therefore, the catcher is secured relative to the mower 11 until the catcher is pivoted about the mounting axis 27 to have the catcher side walls 31 and 32 move away from the entrapment of the mower frame pieces 12 and 13 and then permit the catcher to be slid off the pins 17 and 18. Of course conversely the catcher can be mounted onto the pins 17 and 18 and then rotated to the position of described entrapment.

As mentioned in the introduction hereof, the catcher 10 is made of a molded plastic material, and it has an opening 33 defined by the catcher sides 28 and 29 and by a lower wall 34 and an upper wall or top 36. Thus the opening 33 appears to be rectangular in the view as shown in FIG. 4, and the bottom panel has a terminal lip 37 and the top panel 36 has a terminal lip or edge 38. The described arrangement relative to the mounting of the catcher 10 on the mower pins 17 and 18 permits the strong and efficient mounting of the catcher 10 while avoiding any blockage or other hindrance of the flow of grass clippings and air into and out of the catcher opening 33. That is, the mounting from the mower, such as the pins 17 and 18, do not extend through any appreciable portion of the opening 33 to block the flow of both clippings and air which must move into and out of the catcher 10 in the function of the catcher receiving clippings thrown by the mower 11, whether it be for the forwardly mounted catcher 10, as in FIG. 1, or for a rearwardly mounted catcher 10 with respect to a rearward discharge reel-type mower.

The catcher therefore basically has parallel side walls 28 and 29 and bottom 34 parallel to the top 36 to thus present a box-like catcher which includes the front lip or shelf portion 37 of the bottom 34 and a back wall 39 which of course joins the bottom wall 34 with the top wall 36. FIGS. 2 and 5 particularly show that the bottom shelf or lip 37 is elevated relative to the remainder of the bottom wall 34, and thus the clippings are retained in the catcher 10 until intentional and desired manual emptying of the catcher is accomplished. Also, FIG. 5 shows that the underneath surface of the shelf 37 has ribs 41 for strength reinforcement of the bottom lip or shelf 37. However, the catcher is to be gripped at the ribs 42 when the catcher is lifted.

Also, the catcher top 36 has depressions or ribs 42 which extend through the width of the catcher 10, as shown in FIGS. 1 and 2, and thus the top 36 has strength reinforcement and the ribs 42 are available for gripping in the lifting of the catcher, and the likelihood of distorting the top 36 is then only remote. Further, the clippings and the entrained air delivered from the mower 11 is generally directed medially of the height of the rear wall 39 and engages the wall, and the air is then directed upwardly and back toward the opening 33 while it is encountered by the inwardly extending depressions 42. This causes the air to be deflected downwardly toward the catcher bottom 34, and thus the clippings are also directed downwardly to be retained within the catcher 10 Again, the air is permitted to travel as described, and there is no element extending across the opening 33 to block the flow of air, as described.

The catcher 10 is thus preferably made from molded plastic and in one piece, and the metal plates 24 can be added thereto for the purpose mentioned.

Catcher side handles 43 and 44 are included as integral parts of the catcher and have openings 46 for receiving the operator's hand in the maneuvering and lifting of the catcher at both handles 43 and 44. Also, channels 47 and 48 are integral with the respective catcher sides 28 and 29 and are blended with the handles 43 and 44, as shown herein. The channels 47 and 48 terminate in ends 49 and 51 which include and define the respective pin bores 19 and 20.

It will now be seen and understood that when the catcher 10 is mounted in its cantilever manner on the mower 11, the moment of the mounting torque is such that the force on the pins 17 and 18, restraining catcher 10 in its cantilever mounting, is such that it is in line with the longitudinal axis 52 along each channel 47 and 48. Thereby, optimum strength through the channel ends 49 and 51 is provided.

The sectional views on sheet 3 of the drawings herein, except for FIG. 8, show the wall-type nature of the shape of the catcher 10 which is made from the rotational molding process, and FIGS. 6, 7, 9, and 10 show that uniform thickness or sheet type of configuration normally achieved in the process of molding. In that process, it would be normal for the catcher channel ends 49 and 51 to be formed as indicated in FIG. 8, that is, FIG. 8, being a section similar to FIG. 11 but not actually taken on the catcher of this invention, shows that the channel bosses, in the instance of FIG. 8 being designated 53, would present the cylindrical bore 20, but the boss inner end or annular wall designated 54 would be virtually unsupported since it freely extends a distance from the channel outer wall designated 56 in FIG. 8. That of course is a weak or inferior arrangement for the wall 53 which is mounted on its respective mower mounting pin, and thus it is an inferior type of arrangement for the mounting means between the catcher and the mower. This is true since the wall 54 shown in FIG. 8 has the annulus designated 57 which is unattached and unsupported with the wall, except for the distal outer wall designated 56.

To rectify the aforementioned deficiency, FIG. 11 shows that there is a ring or washer 58 which is shown in FIG. 11 to be embedded in the molded plastic and which also has a central opening 59 for receiving the mower mounting pin. Of course there would be a washer or ring 58 in each catcher boss 49 and 51, for the strength reinforcement specified herein. With the inclusion of the rings 58, the plastic being molded will bridge the otherwise open annulus 57, just as shown in FIG. 11, and thus there will be plastic at 61 which will securely present the respective bosses 49 and 51 and avoid the weakness mentioned in connection with FIG. 8. Thus the member 58 is an insert which is of any suitable configuration and material for providing the bridging of the plastic material throughout the otherwise open annulus 57. Bridging can also be established alternatively by an abutment or insert or disc member 63 shown for FIG. 8, and it is shown to be positionable in the direction of the arrow thereat so as to have contact with surface 64 at its own flat surface 66. As such, the surface 66 would abut the usual (unshown) plug commonly used in forming the opening 20. The member 63 is used alternative to the washer 58 and only for the molding process to create the briding 61 at the otherwise annular opening 57, and the insert is then removed. Insert 63 is not a part of the finished catcher 10. The important feature is to establish bridging, and use of either the washer 59 or the insert 63 is the catalyst for that bridging and they are in position during the molding process.

FIG. 8 shows that without the use of either the washer 58 or the insert 63, the bore 20 is defined by the annular wall 54 and there is another and larger annular wall 68 spaced concentric from the wall 54. Either the washer 58 or the insert 63, depending upon which one is employed, provide for the bridging 61 between the annular walls 54 and 68, as shown in FIG. 11 in the then end product. The walls 54 and 68, are shown in FIG. 11 in the then end product. The walls 54 and 68 are tubular and of different diameters to be nested, as shown, and they are concentric and radially spaced apart through the annulus 57 along the plane of the surface 64 which is common to the circular ends 69 and 71 of the tubular walls 54 and 68. The ring 58 and the disc 63 are suitably suspended in position for the molding process.

Thus a sturdy and lightweight catcher is provided, and only minimum of plastic material is required to provide the catcher having substantial capacity and arrangement for holding and trapping the clippings. The catcher and mower assembly is shown and described, and the method of making same is also, and inherently, disclosed herein.

FIG. 6 also shows the depression 42, and FIG. 10 shows air flow line 62 which engages the first depression 42. The depression 42 which is closest to the catcher opening 33 can serve as the hand grip or handle, if desired, but both depressions 42 are available for stiffening the upper wall 36 and for thereby reinforcing the catcher throughout its upper panel 36, just as the ribs 41 stiffen the lower panel 34 and the side channels 47 and 48 stiffen the side panels in conjunction with the two side handles 43 and 44.

In the rotational mold process, the molten plastic is placed into the mold which is then rotated and, in the well-known process, the molten plastic adheres to the surfaces of the mold for presenting the final catcher wall thicknesses, as shown in the drawings. One skilled in the art will readily understand that process. Also, it will be readily understood that the insert member, either that washer 58 or the disc 63 will be suitably suspended in the mold for the purpose of the molding process described herein. In that instance, it will be also understood that there would be a core, in the form of a plug, in the mold at the opening 20, and the washer 58 and the disc 63 would be suitably mechanically supported on that plug for the molding process. Of course the insert 63 is then removed from the final molded catcher, as previously described.

What is claimed is:

1. In a mower-mounted grass catcher and reel lawn mower assembly, a catcher and a reel mower, the catcher having a rigid body and being cantilever mountable on the mower to extend outward of the mower and having an opening facing the mower for receiving grass clippings thrown outwardly by the mower, said rigid body being defined by two side walls and a bottom panel and a top panel and with said panels extending between said side walls and with all being contiguous to said opening, the improvement comprising strengthening ribs integrally formed in and extending along both said panels adjacent said opening and substantially to and from said side walls for strength reinforcement of said panels, a handle on each of said side walls, and sole mower-mounting means on each said side walls for removably mounting and supporting the catcher relative to said mower.

2. The mower-mounted grass catcher and reel lawn mower assembly as claimed in claim 1, wherein said mower-mounting means includes two axially aligned and spaced-apart pins extending along a common axis on a horizontal axis on said mower, and said catcher having two bores in said side walls axially aligned on a common axis and being spaced-apart for respectively sliding onto said pins in the cantilever mounting of said catcher onto said mower.

3. The mower-mounted grass catcher and reel lawn mower assembly as claimed in claim 2, wherein both of said pins terminate in a respective free end pointing in the same direction along said common axis of said pins, for slidable mounting and dismounting of said catcher relative to said mower from a side of said mower corresponding to said direction.

4. The mower-mounted grass catcher and reel lawn mower assembly as claimed in claim 3, wherein said pins are of different lengths along said horizontal axis for alteration of the occurrence of engagement and disengagement of said pins with said bores in the mounting and dismounting of said catcher relative to said mower.

5. In a mower-mounted grass catcher and reel lawn mower assembly, a catcher and a reel mower, the catcher having a rigid body and being cantilever mountable on the mower to extend outward of the mower and having an opening facing the mower for receiving grass clippings thrown outwardly by the mower, said rigid body being defined by two side walls and a bottom panel and a top panel and with said panels extending between said side walls and with all being contiguous to said opening, the improvement comprising said mower having two axially aligned and spaced-apart pins extending along a common horizontal axis on said mower, and said catcher having two bores in said side walls axially aligned on a common axis and being spaced-apart for respectively sliding onto said pins in the cantilever mounting of said catcher onto said mower.

6. The mower-mounted grass catcher and reel lawn mower assembly, as claimed in claim 5, wherein both of said pins terminate in a respective free end pointing in the same direction along said common axis of said pins, for slidable mounting and dismounting of said catcher relative to said mower from a side of said mower corresponding to said direction.

7. The mower-mounted grass catcher and reel lawn mower assembly, as claimed in claim 6, wherein said pins are of different lengths along said horizontal axis for alternation of the occurrence of engagement and disengagement of said pins with said bores in the mounting and dismounting of said catcher relative said mower.

8. The mower-mounted grass catcher and reel lawn mower assembly, as claimed in claim 5, wherein said catcher rigid body is of plastic material, and with an insert member imbedded into said rigid body at each of said side walls and having a circular opening matching said bore for axially aligning with said bores and thereby strengthening said catcher at said bores.

9. The mower-mounted grass catcher and reel lawn mower assembly, as claimed in claim 8, wherein said bores are elongated on said axis, and each of said insert members is a washer and is imbedded in said side wall at one end of said bore.

10. The mower-mounted grass catcher and reel lawn mower assembly, as claimed in claim 9, wherein said rigid body includes a channel on each said side wall and extending away from the interior of said catcher, and with said bores and said washers being disposed in said channels.

11. The mower-mounted grass catcher and reel lawn mower assembly, as claimed in claim 5, wherein said side walls each include a channel thereon, and said bores being disposed in said channels.

12. The mower-mounted grass catcher and reel lawn mower assembly, as claimed in claim 11, wherein each of said channels has an opening therein for forming a handle on each of said channels.

13. The mower-mounted grass catcher and reel lawn mower assembly, as claimed in claim 5, wherein at least one of said panels has strengthening ribs extending therealong adjacent said opening for strength reinforcement.

14. A grass catcher for use in an assembly with a lawn mower having pin-mounting means onto which said catcher is slidably mounted, a grass catcher having opposite sides with each thereof having a bore therein for receiving said pin-mounting means for mounting said catcher onto said mower, each of said bores being defined by a tubular wall located in said sides, each of said catcher sides also having a second tubular wall radially outwardly spaced from the first-mentioned said tubular wall to thereby present a concentric pair of said tubular walls, and the terminal ends of each said pair of said tubular walls being physically joined together across the radial space between said pair of said tubular walls.

15. A grass catcher for use in an assembly with a lawn mower having pin-mounting means onto which said catcher is slidably mounted, said catcher being made by the process of plastic molding said catcher to provide opposite sides with each thereof having a bore therein for receiving said pin-mounting means for mounting said catcher onto said mower, each of said bores being defined by a tubular wall located in said sides, each of said catcher sides also having a second tubular wall radially outwardly spaced from the first-mentioned said tubular wall to thereby present a concentric pair of said tubular walls, and positioning a member in the radial space between the terminal ends of each of said pair of said tubular walls for bridging across said space during the molding of said catcher and thereby join together via the molding plastic the terminal ends of each said pair of said tubular walls across the radial space between said pair of said tubular walls.

16. The grass catcher for use in an assembly with a lawn mower having pin-mounting means onto which said catcher is slidably mounted, as claimed in claim 15, wherein said member is removed from said space after the plastic is molded solid.

17. In a mower-mounted grass catcher and reel lawn mower assembly, a catcher and a reel mower, catcher mower-mounting means respectively on said catcher and said mower for removably mounting said catcher onto said mower, said catcher having a rigid body and being cantilever mounted on said mower to extend outward of said mower and having an opening facing said mower for receiving grass clippings thrown outwardly by said mower, said rigid body being defined by two side walls and a bottom panel and a top panel and with said panels extending between said side walls and with all being contiguous to said opening, the improvement comprising said catcher being molded to include a channel extending along each of said side walls for strength reinforcement of said side walls, said mower-mounting means of said catcher being molded in each of said channels for removably mounting said catcher onto said mower and including two axially aligned and spaced-apart pins extending along a common axis on a horizontal axis on said mower, and said catcher mower-mounting means having two bores in said channels axially aligned on a common axis for respectively sliding onto said pins in the cantilever mounting of said catcher onto said mower.

18. The mower-mounted grass catcher and reel lawn mower assembly as claimed in claim 17, including a stop on one of said pins for engagement of said catcher to limit the position of said catcher relative to said mower when said catcher is slid onto said pins.

19. The mower-mounted grass catcher and reel lawn mower assembly as claimed in claim 17, including an abutment on said catcher at a location spaced from said axis and for abutting said mower in the cantilever mounting of said catcher, and with said channel being elongated in the direction oblique to a line between said axis and said abutment for presenting the maximum strength of said channels along said direction and resisting the torque on and created by said catcher due to said cantilever mounting.

* * * * *